US005148519A

United States Patent [19]

Ishii

[11] Patent Number: 5,148,519

[45] Date of Patent: Sep. 15, 1992

[54] METHOD FOR GENERATING PATTERNS BASED ON OUTLINE DATA

[75] Inventor: Takatoshi Ishii, Tokyo, Japan

[73] Assignee: ASCII Corporation, Tokyo, Japan

[21] Appl. No.: 306,328

[22] Filed: Feb. 3, 1989

[30] Foreign Application Priority Data

Feb. 4, 1988 [JP] Japan ........ 63-24822
Dec. 16, 1988 [JP] Japan ........ 63-318228

[51] Int. Cl.$^5$ ........ G06F 5/62
[52] U.S. Cl. ........ 395/141; 395/150
[58] Field of Search ........ 364/518; 340/730, 735, 340/790, 728; 358/261.1, 431, 470; 395/134, 141, 150

[56] References Cited

U.S. PATENT DOCUMENTS 4,845,520 7/1989 Mori ........ 340/728
4,847,607 7/1989 Schoon ........ 340/730
4,857,904 8/1989 Schoon ........ 340/730
4,870,498 9/1989 Schoon ........ 358/261.1 X
4,990,903 2/1991 Cheng et al. ........ 340/731

*Primary Examiner*—Gary V. Harkcom
*Assistant Examiner*—Mark K. Zimmerman
*Attorney, Agent, or Firm*—Hoffmann & Baron

[57] ABSTRACT

A method for generating display patterns using a display memory which stores one bit of data for each pixel of a display apparatus. The stored data represents an outline of a display pattern. The stored data is consecutively read to generate dot data corresponding to the pattern being displayed. Character data corresponding to a current display pixel is also read from a display memory. Then buffer data which relates to a current scan line and the scan line directly above are read from a line buffer. Dot data is generated by performing logical computations on the current pixel data and line buffer data relating to the scan line. The dot data is then written into the line buffer for display.

2 Claims, 8 Drawing Sheets

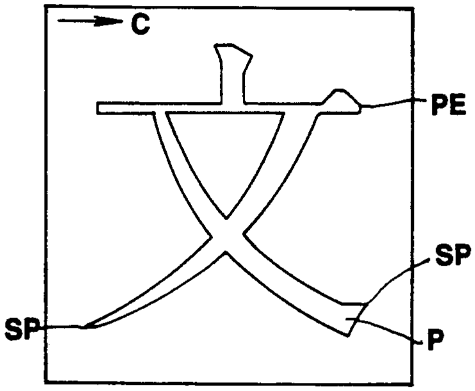
FIG. 1
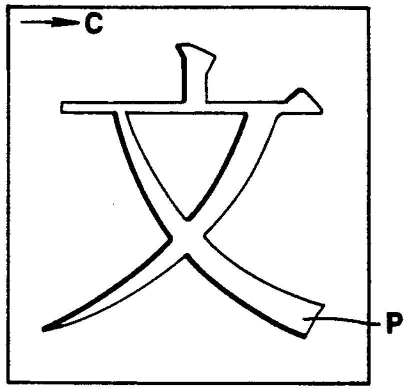
FIG. 5
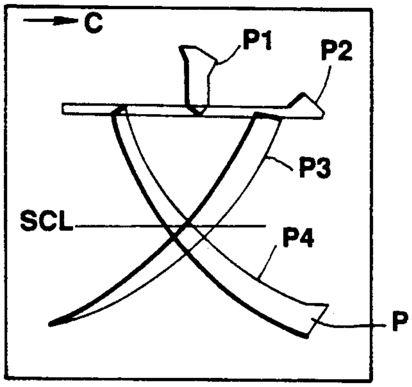
FIG. 7
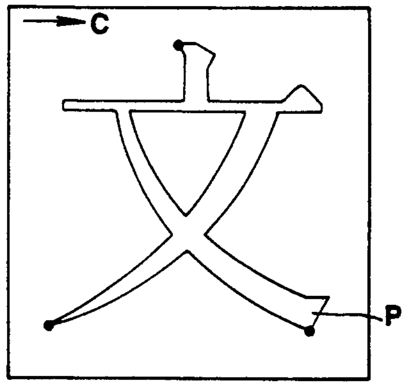
FIG. 9
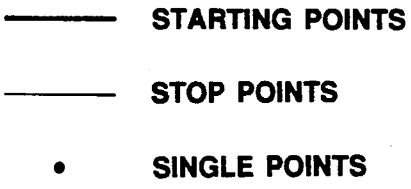

24

UPPER BUF. DATA (U:U0,U1)
0 0 2 1 1 1 3 0 0 0 0 0 0 0 0 2 1 1 1 3 0 0 0 0

CHARACTER DATA (R)
0 0 0 1 0 0 0 1 0 0 0 0 0 0 0 1 0 0 0 1 0 0 0 0 0 0

24

LEFT BUF. DATA (L:L0,L1)
0 0 0 2 1 1 1 3 0 0 0 0 0 0 2 1 1 1 3 0 0 0 0 0

DOT DATA (DD)
0 0 0 1 1 1 1 1 0 0 0 0 0 0 1 1 1 1 1 0 0 0 0 0

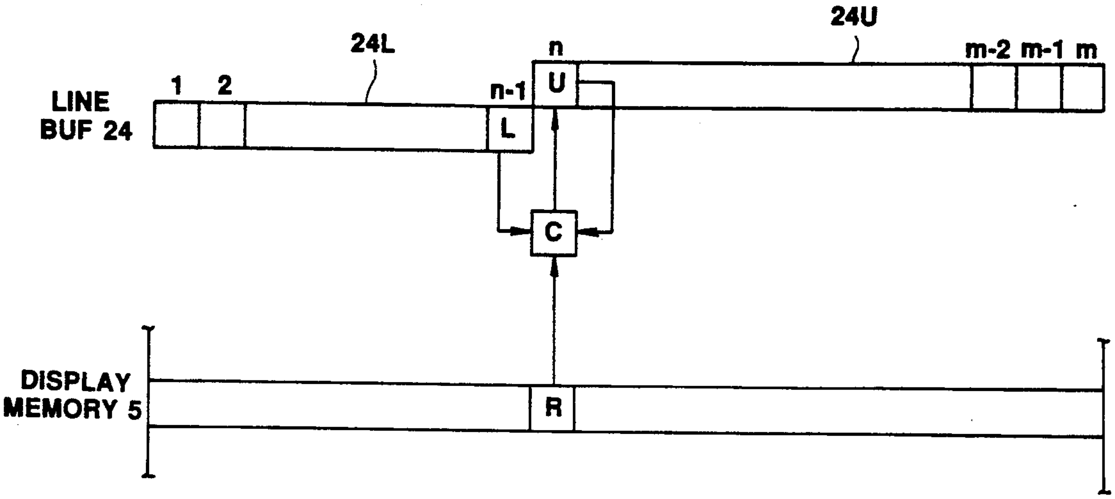
FIG.11
| R | $L_1$ | $L_0$ | $U_1$ | $U_0$ | $C_1$ | $C_0$ | PIXEL(FIG.13) |
|---|---|---|---|---|---|---|---|
| 0 | 0 | 0 | x | x | 0 | 0 | P17 |
| 0 | 0 | 1 | 0 | 0 | 0 | 0 | (P14) |
| 0 | 1 | 0 | 0 | 0 | 0 | 0 | P15 |
| 0 | 1 | 1 | 0 | 0 | 0 | 0 | P16 |
| 0 | 0 | 1 | 0 | 1 | 0 | 1 | P11 |
| 0 | 1 | 0 | 0 | 1 | 0 | 1 | P12 |
| 0 | 1 | 1 | 0 | 1 | 0 | 1 | P13 |
| 0 | 0 | 1 | 1 | 0 | 0 | 1 | (P8) |
| 0 | 1 | 0 | 1 | 0 | 0 | 1 | P9 |
| 0 | 1 | 1 | 1 | 0 | 0 | 1 | P10 |
| 0 | 0 | 1 | 1 | 1 | 0 | 1 | P5 |
| 0 | 1 | 0 | 1 | 1 | 0 | 1 | (P6)[P18] |
| 0 | 1 | 1 | 1 | 1 | 0 | 0 | P7 |
| 1 | 0 | 0 | x | x | 1 | 0 | P1 |
| 1 | 0 | 1 | x | x | 1 | 1 | P2 |
| 1 | 1 | 0 | x | x | 1 | 1 | P3 |
| 1 | 1 | 1 | x | x | 1 | 1 | P4 |
FIG.12
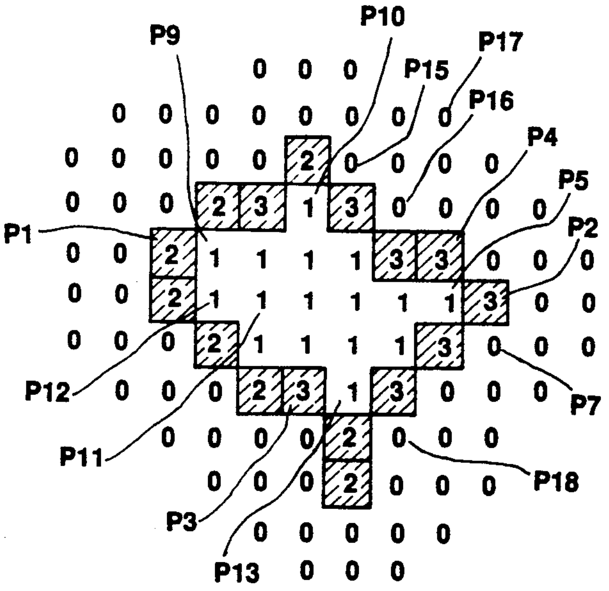
FIG.13

FIG. 17a HSYN
FIG. 17b DTM
FIG. 17c R(CHARACTER DATA)
FIG. 17d RCK
FIG. 17e RA (READ ADDRESS)
FIG. 17f R1,R0
FIG. 17g U1,U0
FIG. 17h DCK
FIG. 17i L1,L0,DD (WRITE DATA)
FIG. 17j WCK
FIG. 17k WA (WRITE ADDRESS)
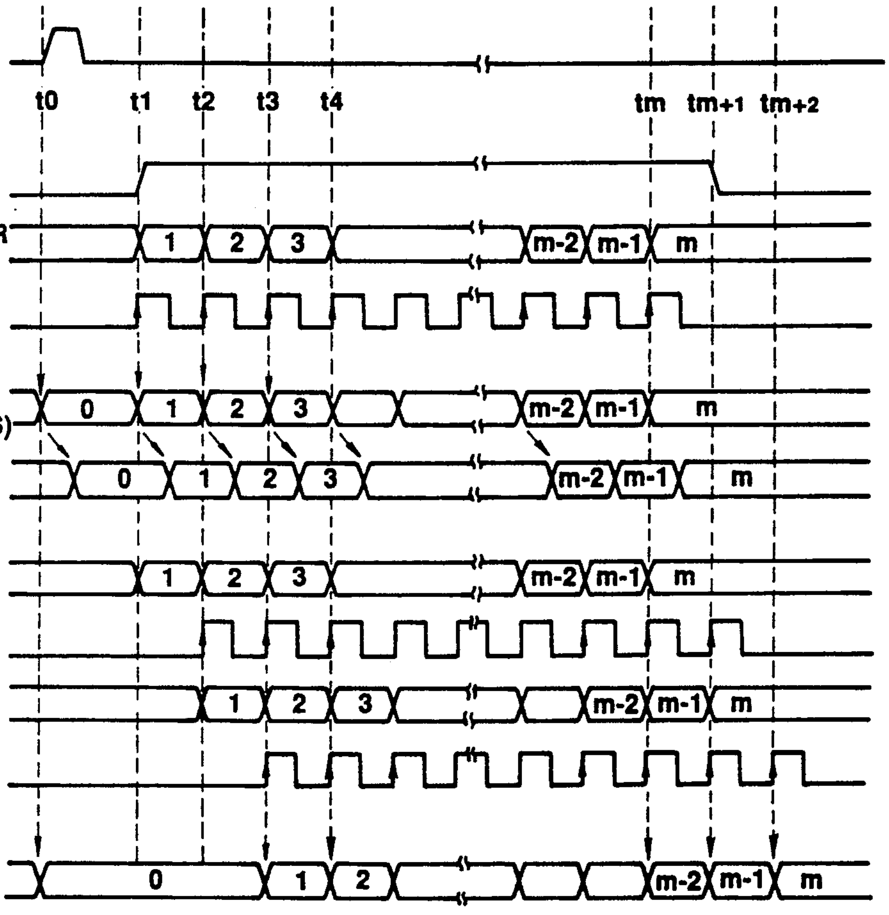

METHOD FOR GENERATING PATTERNS BASED ON OUTLINE DATA

BACKGROUND OF THE INVENTION

1. Field of the Invention

The present invention relates to a method for generating character patterns and/or figure patterns that can generate high-quality character patterns and/or figure patterns used in data processing systems such as computers and wordprocessors.

2. Prior Art

A modern graphic display generally consists of three components: a frame memory, a monitor, and a display controller. In order to display characters on the screen of the monitor, it is necessary to write the image of characters or character patterns into the frame memory. FIG. 1 shows an example of character data used by the method disclosed in the Japanese Patent Publication No. 53-41017. The character pattern P is stored in a memory other than the frame memory in the form of outline data which indicates the outlines PE of the character. When the character is to be displayed, the outline data is written in the frame memory and the interior space inside the lines is filled before display, or is filled during display by use of software.

In the conventional method for generating character patterns mentioned above, however, it is time consuming to find starting points and stop points of the outline data on the frame memory to fill the interior space between them. This retards high-speed processing of the character generation and display. Moreover, in the conventional method mentioned above, even single points at the tips of a character stroke must be represented by two points because the outline data is always defined by a pair of starting points and stop points in the outlines. As a result of this, the tips of the character strokes cannot form a sharp point when desired. Furthermore, setting the outline data requires the elimination of all interior line segments that occur at intersections of strokes. The task of eliminating these segments is tedious and time consuming.

SUMMARY OF THE INVENTION

It is therefore an object of the present invention to provide a method that can generate character patterns and/or figure patterns at a high speed.

Another object of the invention is to provide a method that can change the scale of characters and/or figures freely.

A further object of the invention is to provide a method that can display strokes and/or segments having single sharp points when desired.

Still another object of the invention is to provide a method in which input operation of the outline data of characters and/or figures is much easier than in the conventional method.

A further object of the invention is to provide a method that can reduce the information needed to define character and/or figure and thus save capacity in the display memory (i.e., frame memory).

In a first aspect of the present invention, there is provided a method for generating character patterns and/or figure patterns by the process of fetching character data and/or figure data stored in memory means, generating dot data corresponding to the character patterns and/or figure patterns based on the character data and/or figure data, and displaying the character patterns and/or figure patterns on a screen of a monitor based on the dot data, the memory means having two or more bits for each of the dot data to form four or more combinations that represent states of each pixel, the method for generating character patterns and/or figure patterns comprising the steps of;

storing the character data and/or figure data in a manner that one of the combinations represents a starting point of the character and/or figure along a scan line of the screen;

storing the character data and/or figure data in a manner that another of the combinations represents a stop point of the character and/or figure along a scan line of the screen, and providing the same dot data between adjacent starting point and stop point along a scan line.

In a second aspect of the present invention, there is provided a method for generating character patterns and/or figure patterns by the process of fetching character data and/or figure data stored in memory means, generating dot data corresponding to the character patterns and/or figure patterns based on the character data and/or figure data, and displaying the character patterns and/or figure patterns on a screen of a monitor based on the dot data, the memory means having two or more bits for each of the dot data to form four or more combinations that represent states of each pixel, the method for generating character patterns and/or figure patterns comprising the steps of;

disintegrating the character patterns and/or figure patterns into elementary strokes and/or segments;

storing the character data and/or figure data in a manner that one of the combinations represents starting points of the strokes and/or segments along a scan line of the screen;

storing the character data and/or figure data in a manner that another of the combinations represents stop points of the strokes and/or segments along a scan line of the screen, and providing the same dot data between adjacent starting point and stop point along a scan line.

In a third aspect of the present invention, there is provided a method for generating character patterns and/or figure patterns by the process of fetching character data and/or figure data stored in memory means, generating dot data corresponding to the character patterns and/or figure patterns based on the character data and/or figure data, and displaying the character patterns and/or figure patterns on a screen of a monitor based on the dot data, the memory means having two or more bits for each of the dot data to form four or more combinations that represent states of each pixel, the method for generating character patterns and/or figure patterns comprising the steps of;

storing the character data and/or figure data in a manner that one of the combinations represents points on outlines of the character and/or figure;

storing the character data and/or figure data in a manner that another of the combinations represents single points of the character and/or figure, the single points being displayed as one pixel on the screen, and providing the same dot data between adjacent starting point and stop point along a scan line.

In a fourth aspect of the present invention, there is provided a method for generating character patterns and/or figure patterns having display memory means for storing character data and/or figure data of 1 bit for each pixel on a screen as information indicating outlines of character and/or figures to be displayed, and having process of reading the stored character data and/or figure data from the display memory means consecutively to generate dot data corresponding to character patterns and/or figure patterns to be displayed on the basis of the character data and/or figure data, the method for generating character patterns and/or figure patterns being provided with line-buffer means containing data relating to pixels on a current scan line as well as on the scan line directly above thereof, the method for generating character patterns and/or figure patterns comprising steps of:

reading character data and/or figure data corresponding to a current displaying pixel from the display memory means;

reading buffer data relating to the scan line and line directly above thereof from the line-buffer means;

generating the dot data by performing logical computation on the character data and/or figure data corresponding to current pixel and line-buffer data relating to the scan lines; and writing the dot data to the line-buffer.

BRIEF DESCRIPTION OF THE DRAWINGS

FIG. 1 is a pictorial view showing outlines of a character to explain a conventional method for generating character patterns;

FIG. 5 is a pictorial view illustrating outline data of a character according to the first embodiment in which thick lines represent starting points and thin lines represent stop points;

FIG. 7 is a pictorial view illustrating outline data of a character according to the second embodiment where thick lines represent starting points and thin lines represent stop points;

FIG. 9 is a pictorial view illustrating outline data of a character according to the third embodiment;

FIG. 11 is a diagram illustrating the relationship between buffer data in the line-buffer 24 and character data R in display memory 5 of the fourth embodiment;

FIG. 12 is a truth table for logic gate 42 according to the fourth embodiment;

FIG. 13 is a pictorial view illustrating an example of display according to the fourth embodiment;

FIG. 17 (a–k) is a timing chart showing the operation of the fourth embodiment.

DESCRIPTION OF THE PREFERRED EMBODIMENTS

The invention will now be described with reference to the accompanying drawings.

(A) FIRST EMBODIMENT

Figure 2:
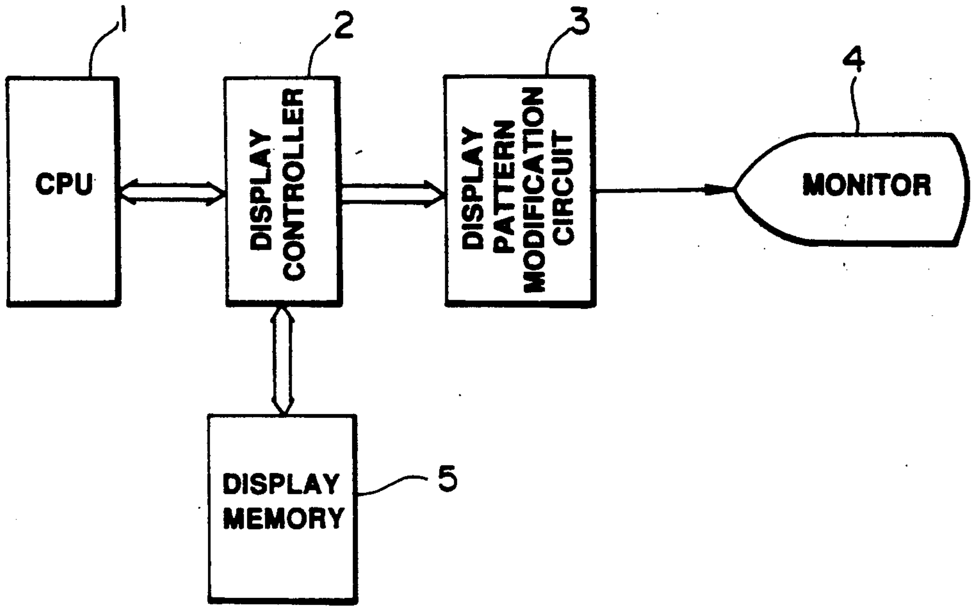
FIG. 2 is a schematic diagram showing the entire configuration of a character display apparatus according to the present invention.

FIG. 2 is a block diagram of the display apparatus in accordance with the present invention. In FIG. 2, numeral 1 designates a central processing unit (CPU); numeral 2 denotes display controller; numeral 3, a display pattern modification circuit; numeral 4, a monitor such as a CRT display device; and numeral 5, display memory for storing character data. The display controller 2 is connected to the display memory 5, and retrieves character data contained therein to generate character patterns.

The display pattern modification circuit 3 and the display memory 5 will be described in more detail. The description of the other blocks will be omitted because these blocks have a construction similar to those of a well-known conventional display apparatus.

Figure 3:
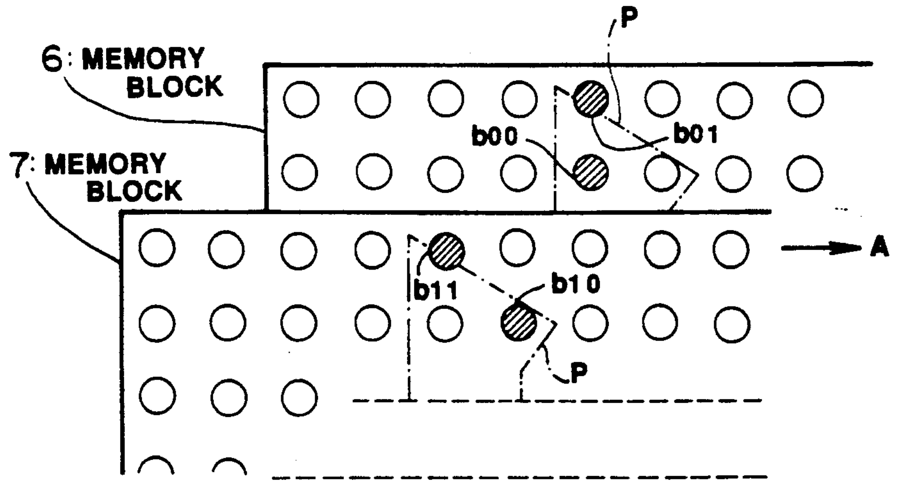
FIG. 3 is a schematic illustration showing the arrangement of bits in a display memory in accordance with a first and a second embodiments.

The display memory 5 includes two planes of memory blocks 6 and 7 as shown in FIG. 3. Each bit in these memory blocks 6 and 7 corresponds to a single pixel on the screen of monitor 4, and the bits in the memory 6 indicate starting points of outline data, while the bits of the memory block 7 indicate stop points of outline data. The memory blocks 6 and 7 are arranged so that the corresponding addresses are accessed simultaneously. The bits in the memory blocks 6 and 7 are read out along the arrow A which indicates the direction of scan lines of the monitor 4.

Figure 4:
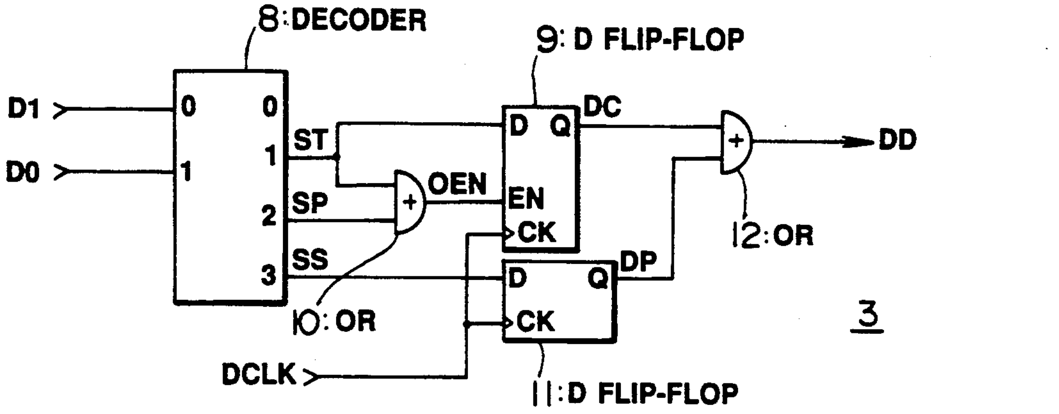
FIG. 4 is a block diagram of a display pattern modification circuit provided in accordance with a first embodiment of the invention.

The construction of the display pattern modification circuit 3 according to the first embodiment is shown in FIG. 4. In FIG. 4, D0 designates data read out from the memory block 6, and D1 denotes data read out from the memory block 7. These data are supplied to a decoder 8.

The decoder 8 has two input terminals for signals D0 and D1, and four output terminals that output decoded signals of the decoder 8. A signal ST produced at output terminal 1 of the decoder 8 is applied to input terminal D of a D flip-flop 9, and to one input terminal of an OR gate 10. A signal SP produced at output terminal 2 of the decoder 8 is supplied to the other input terminal of the OR gate 10, and a signal SS produced at terminal 3 of the decoder 8 is applied to an input terminal D of a D flip-flop 11.

The D flip-flop 9 is enabled when a signal OEN supplied from the OR gate 10 becomes logic-1, and loads the signal ST at the leading edge of a dot clock signal DCLK applied from the display controller 2. Similarly, the D flip-flop 11 loads the signal SS at the leading edge of the dot clock signal DCLK. Output signals DC and DP of the D flip-flop 9 and 11 are applied to input terminals and OR gate 12. The OR gate 12 produces a dot signal DD of logic-1 if either or both of the signals DC and DP assume logic-1. The dot signal DD is supplied to the monitor 4.

The operation of the first embodiment will be described.

(1) PRESETTING OF CHARACTER DATA

In the first embodiment, character patterns to be displayed are prestored in the memory blocks 6 and 7 in the display memory 5. The area in the memory blocks 6 and 7 occupied by the character data varies in accordance with the resolution of the monitor 4 and the size of characters displayed on the screen thereof. For the convenience of explanation, the presetting of character data for a single character, shown in FIG. 5, will be described.

The data D0 and D1 read out from the memory blocks 6 and 7 indicate the following commands for each pixel on the screen:

| D1 | D0 | command names |
|---|---|---|
| 0 | 0 | REPETITION |
| 0 | 1 | STARTING |
| 1 | 0 | STOP |
| 1 | 1 | SINGLE |

The REPETITION command means that the current character data indicates a repetition of the previous data assigned to the left-hand adjacent pixel of the current pixel. The STARTING command indicates that the current pixel is one of the starting points of a stroke shown in FIG. 5 by thick lines. The STOP command, on the other hand, indicates that the current pixel is one of the stop points of the stroke shown in FIG. 5 by thin lines. The SINGLE command means that the current pixel represents one of the single points.

Starting points of a character consist of pixels at the left-most edge of each stroke of the character. The memory block 6 stores data indicative of all starting points of the character, a part of which is shown in FIG. 3; bits of logic-1, such as b00, in the memory block 6 indicate the starting points. Stop points of a character consist of pixels at the right-most edge of each stroke of the character. The memory block 7 stores data indicative of all stop points of the character; bits of logic-1, such as b10, in the memory block 7 indicate the stop points. The memory blocks 6 and 7 also store data indicative of single points of strokes. A single point is represented by one pixel on the screen and usually appears at the ends of a stroke as designated by a pair of b01 and b11 in FIG. 3. As can be seen, these points b01 and b11 are placed at the same location in each memory block 6 and 7, so that the data indicate a single point.

All the other bits in the memory block 6 and 7 are made logic-0. The logic-0 data at the same location in the memory block 6 and 7 indicate the REPETITION command. Thus, when the pixel previous to the current pixel is outside the character outline, the current pixel will also be outside the character; when the previous pixel is interior of the character outline, the current pixel will also be in the interior of the character.

(2) GENERATION OF CHARACTER PATTERNS

When the CPU 1 presents CHARACTER PATTERN GENERATION command to the display controller 2, it consecutively reads out the data D0 and D1 from the corresponding locations of the memory blocks 6 and 7 in the display memory 5. The data D0 and D1 are directly transferred to the display modification circuit 3.

The display modification circuit 3 generates dot data DD that represents character patterns in response to the data D0 and D1, and supplies the data DD to the monitor 4. The details of the operation will be described.

(a) Start

When the data D0 is logic-1 and data D1 is logic-0, the signal ST from the output terminal 1 of the decoder 8 becomes logic-1, causing the output signal OEN of the OR gate 10 to become logic-1. As a result, the D flip-flop 9, being enabled, loads logic-1 at the leading edge of the dot clock DCLK, and simultaneously, the D flip-flop 11 loads logic-0. Thus, the output signal DD of the OR gate 12 becomes logic-1, being applied to the monitor 4.

(b) Stop

When the data D0 is logic-0 and data D1 is logic-1, the signal ST assumes logic-0, while the signal SP from the output terminal 2 of the decoder 8 becomes logic-1, causing the output signal OEN of the OR gate 10 to become logic-1. As a result, the D flip-flop 9 is enabled and both the D flip-flops 9 and 11 load logic-0 at the leading edge of the dot clock DCLK. Thus, both the output signals DC and DP of the D flip-flops 9 and 11 assume logic-0, causing the output DD of the OR gate 12 to become logic-0. The output DD is supplied to the monitor 4.

(c) Repetition

When both data D0 and D1 are logic-0, only the signal from output terminal 0 of the decoder 8 becomes logic-1, and all the other terminals 1, 2 and 3 fall to logic-0. In this case, the output signal OEN assumes logic-0 and disables the D flip-flop 9, so that the input data applied to the input terminal D of the flip-flop 9 is not taken thereinto, and the D flip-flop 9 maintains its previous state. On the other hand, the D flip-flop 11 becomes logic-0 at the leading edge of the clock signal DCLK. Thus, if data DC retained in and outputted from the D flip-flop 9 is logic-1, the output DD from the OR gate 12 is also logic-1; if the data DC is logic-0, the output DD is also logic-0, and the output DD is transferred to the monitor 4. Hence, the previous state is repeated.

(d) Single Point

When both the value of the data D0 and D1 are logic-1, the signal SS from the output terminal 3 of the decoder 8 becomes logic-1, causing the D flip-flop 11 to load logic-1 at the leading edge of the dot clock DCLK. The D flip-flop 9 is disabled by the signal OEN of logic-0, so that the output signal DC of the flip-flop 9 keeps the previous value. Although the value of signal DC is thus undetermined, the value of signal DP is logic-1. Hence, the output DD of the OR gate 12 becomes logic-1, being transferred to the monitor 4, and the monitor 4 displays the character on screen based on the character generating signal DD.

According to the first embodiment, two planes of memory blocks 6 and 7 are provided, and the starting points and stop points of characters to be displayed are stored in the memory blocks 6 and 7 respectively. The display pattern modification circuit 3 generates the dot data DD to be supplied to the monitor 4 according to the starting point and stop point data, and repeats the previous state between these points. Hence, filling the interior between the outlines of characters is unnecessary. Therefore, it becomes possible to write the character data into the memory blocks 6 and 7 in a short time, so the high speed generation of character patterns can be achieved.

Moreover, by storing the starting point and stop point data at the corresponding locations on the memory blocks 6 and 7, single points in the character pattern such as end points of strokes can be defined clearly. As a result, the single points at the end of strokes are displayed clear and sharp. Furthermore, changing the scale of character patterns P does not degrade the visual quality of characters because single points can be displayed. When large high-quality character patterns are scaled down, some portions of the character pattern may be represented by single points. Although a conventional display apparatus cannot display such portions in single points, the first embodiment enables such a display. Consequently, parts of characters which are displayed indistinctly or are lost in a conventional display apparatus, are clearly displayed on the screen of the first embodiment.

(B) SECOND EMBODIMENT

A second embodiment of the invention will now be described referring to FIG. 6 and FIG. 7. In the following description like numerals refer to like parts in the first embodiment, and the description thereof will be omitted.

The differences between the second embodiment and the first one are the construction of the display pattern modification circuit 3 and the content of the character data stored in the display memory 5.

Figure 6:
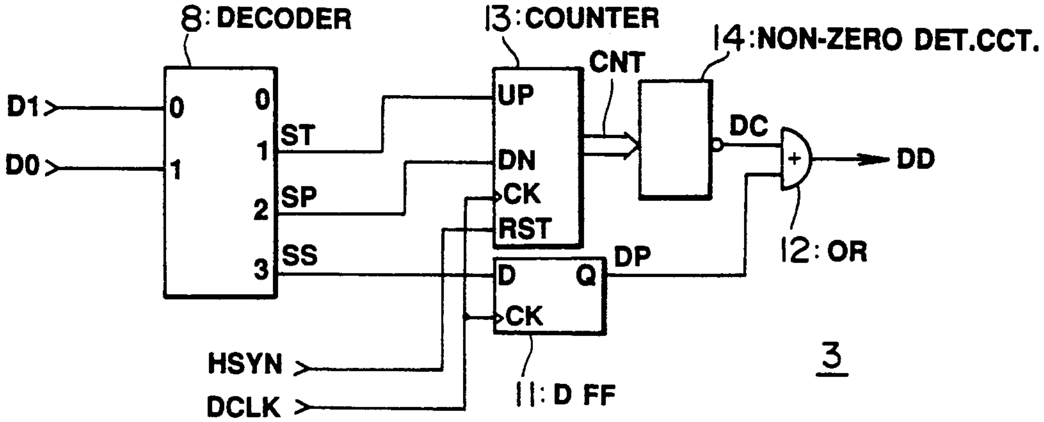
FIG. 6 is a block diagram of a display pattern modification circuit provided in accordance with a second embodiment of the invention.

FIG. 6 shows a block diagram of the display pattern modification circuit 3 of the second embodiment. In FIG. 6, signal ST is supplied to the UP terminal of counter 13 from the output terminal 1 of the decoder 8. Signal SP is supplied to the DN (down) terminal of the counter 13 from the output terminal 2 of the decoder 8. Signal SS is supplied to the input terminal of the D flip-flop 11 from the output terminal 3 of the decoder 8. The counter 13 is reset by horizontal synchronizing signal HSYN and increments or decrements the content of the counter 13 in accordance with applied signal ST or SP with the leading edge of the clock signal DCLK. The count value CNT of the counter 13 is supplied to a non-zero detecting circuit 14 that presents output signal DC of logic-0 when the value CNT is zero; while it otherwise presents that of logic-1. As in the first embodiment, the D flip-flop 11 loads signal SS with the leading edge of the clock signal DCLK. Output signals DC and DP of the non-zero detecting circuit 14 and the D flip-flop 11 are supplied to the OR gate 12, which presents output signal DD of logic-1 if one or more of the signals DC and DP assume the state of 1.

The operation of the second embodiment will be described.

(1) SETTING OF CHARACTER DATA

In the embodiment, character patterns P are separated into constituent strokes and the character data representing these strokes are stored in the block memories 6 and 7 as character data. For example, the character pattern P shown in FIG. 7 is composed of four strokes P1 to P4. More specifically, each bit in the block memory 6 that corresponds to starting points and single points of the elementary strokes P1 to P4 along scan lines is set to logic-1. Similarly, each bit on the block memory 7 that corresponds to stop points and single points is set to logic-1.

(2) GENERATION OF CHARACTER PATTERN

When a horizontal synchronizing signal HSYN occurs, addresses of the block memories 6 and 7 from which character data are to be read, are initialized, and the counter 13 is reset, clearing the content thereof to zero.

(a) Process of Starting Point

When data D0 is logic-1 and D1 is logic-0, signal ST from the output terminal 1 of the decoder 8 assumes logic-1 and signal SS from the output terminal 3 assumes logic-0. This causes the counter 13 to increase the content CNT by one, and at the same time, the D flip-flop 11 to load logic-1 signal with the leading edge of the clock signal DCLK. Then, output signal DC of the non-zero detecting circuit 14 becomes logic-1 because the content CNT of the counter 13 becomes non-zero. As a result, output signal DD from the OR gate 12 assumes logic-1, being supplied to the monitor 4.

(b) Process of Stop Point

When data D0 is logic-0 and D1 is logic-1, signal SP from the output terminal 2 of the decoder 8 assumes logic-1 and signal SS from the output terminal 3 takes on logic-0. This causes the counter 13 to decrease the content CNT by one, and at the same time the D flip-flop 11 to load logic-0.

Being decreased, the content CNT of the counter 13 may assume a value other than zero. For example, on a scan line SCL in FIG. 7, the content CNT sequentially takes values "0", "1", "2", "1", "0", because starting points and stop points continually occurs twice, respectively. However, the content CNT always assumes the value zero when the stop command is issued at the stop points of the character pattern P. This is because the numbers of start commands and stop commands on a scan line are always equal. Consequently, the output signal DC of the non-zero detecting circuit 14 becomes logic-0 when the stop command is issued, thus making the output signal DD of the OR gate 12 logic-0, and the signal DD is supplied to the monitor 4. On the other hand, the content CNT has a value not equal to zero at the points other than stop points of the character pattern P. Consequently, output signal DC of the non-zero detecting circuit 14 becomes logic-1. This makes output signal DD of the OR gate 12 logic-1, and the signal DD is transferred to the monitor 4.

(c) Repetition

When both data D0 and D1 are logic-0, logic-1 appears only at the output terminal 0 of the decoder 8, and all the other terminals of the decoder 8 present logic-0. Consequently, the counter 13 keeps the content CNT at the previous state, and the D flip-flop loads logic-0 with the leading edge of the clock signal DCLK. Hence, output signal DD from the OR gate 12 is logic-0 if the content CNT of the counter 13 is zero and then output signal DC from the non-zero detecting circuit 14 is zero. On the other hand, output signal DD becomes logic-1 if the content CNT of the counter 13 is non-zero. Thus, output signal DD of the OR gate 12 repeats the previous value, and the signal DD is transferred to the monitor 4.

(d) Single Point

When both data D0 and D1 are logic-1, signal SS from the output terminal 3 of the decoder 8 becomes logic-1. As a result, the D flip-flop 11 loads logic-1 with the leading edge of the clock signal DCLK. Consequently, output signal DP of the D flip-flop 11 becomes logic-1, so that output signal DD of the OR gate 12 assumes logic-1 independent of the value of output signal DC from the non-zero detecting circuit 14. The logic-1 signal DD is transferred to the monitor 4.

Thus, the character patterns P are displayed on the screen of the monitor 4 based on the character pattern generating signal DD supplied to the monitor 4.

Therefore, as in the first embodiment the character pattern can be generated without filling the space within the outline in a separate procedure. Hence, writing character patterns into the memory blocks 6 and 7 is performed at a high speed, and quick display of high quality characters can be achieved. Furthermore, as in the first embodiment, single points at the tip of strokes can be displayed sharp and clear, so that when the scale of character patterns is altered, a degradation of display quality does not occur.

The second embodiment serves to reduce the memory demands on the memory blocks 6 and 7, because character patterns are separated into constituent strokes and the data of starting points and stop points of the strokes are stored so that they can be used as a common resource to produce various characters. Also, according to the embodiment, the elimination of line segments that occur in the interior at intersections of strokes becomes unnecessary. Therefore, writing or choosing a limited number of strokes is sufficient to generate numerous character patterns, resulting in the high speed writing of character patterns.

(C) THIRD EMBODIMENT

The third embodiment of the invention will be described referring to FIG. 8 and 9.

The difference between the third embodiment and the first and second ones is in the construction of the display pattern modification circuit 3 and the content of character data stored in the display memory 5.

Figure 8:
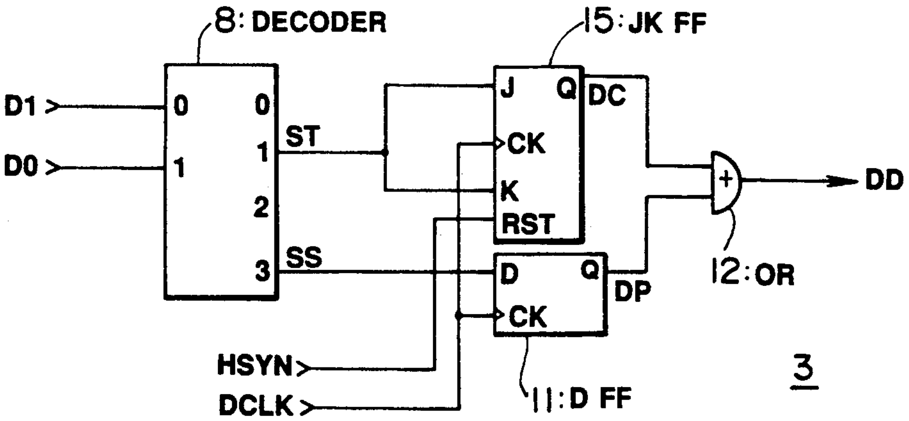
FIG. 8 is a block diagram of a display pattern modification circuit provided in accordance with a third embodiment of the invention.

FIG. 8 is a block diagram illustrating the construction of the display pattern modification circuit 3. Signal ST that appears at the output terminal 1 of the decoder 8 is supplied to both J and K terminals of a JK flip-flop 15, while signal SS that appears at the output terminal 3 of the decoder 8 is supplied to the D terminal of the D flip-flop 11.

The JK flip-flop 15 is reset by the horizontal synchronizing signal HSYN and then loads the signal ST at the leading edge of clock signal DCLK. The D flip-flop 11, on the other hand, loads the signal SS at the leading edge of clock signal DCLK as in the first and second embodiments. Output signals DC and DP of the JK flip-flop 15 and D flip-flop 11 are supplied to the OR gate 12 which produces logic-1 output signal DD when one or more signals DC and DP assume logic-1. The signal DD is transferred to the monitor 4.

Operation of the third embodiment will be described.

(a) PRESETTING OF CHARACTER DATA

Data D0 and D1 read out of the memory block 6 and 7 correspond to the following commands issued for each pixel on the screen.

| D1 | D0 | command name |
|---|---|---|
| 0 | 0 | repetition |
| 0 | 1 | start/stop |
| 1 | 0 | . . . |
| 1 | 1 | single point |

As shown in FIG. 9, distinction between outlines (which consist of starting points and stop points) and single points of the character pattern P is made in the process of input, and data indicative of outlines and single points are stored in the memory block 6 and 7.

This will be more specifically explained referring to the character pattern P shown in FIG. 9.

The memory block 6 stores logic-1 bit data at locations corresponding to positions of outlines in the character pattern P along scan lines, and all the other bits of the memory block 6 are set logic-0. Also both memory blocks 6 and 7 store logic-1 bit data at locations corresponding to positions of single points in the character pattern P. That is, the memory block 6 stores outline data including single point data while the memory 7 stores only single point data of the character pattern P.

(2) GENERATION OF CHARACTER PATTERNS

When horizontal synchronizing signal HSYN occurs, it initializes the read-out address of the memory blocks 6 and 7, and resets the JK flip-flop 15 so that the output signal DC thereof becomes logic-0.

(a) Start/Stop

When data D0 read from memory block 6 is logic-1 and data D1 read from memory block 7 is logic-0, signal ST that appears at the output terminal 1 of the decoder 8 becomes logic-1, which is applied to the J and K terminals of the JK flip-flop 15 so that the state of the flip-flop 15 is reversed with the leading edge of the clock signal DCLK. On the other hand, signal SS that appears at the output terminal 3 of the decoder 8 becomes logic-0, and the D flip-flop 11 loads the logic-0 signal with the leading edge of the clock DCLK.

Thus, when the JK flip-flop 15 was continually logic-0, and then reversed, output signal DC thereof turns to logic-1, causing output signal DD of the OR gate 12 to become logic-1. On the other hand, when the JK flip-flop 15 was continually logic-1, and then reversed, output signal DC turns to logic-0, which makes output signal DD of the OR gate 12 logic-0. In any case, the JK flip-flop 15 reverses with the every occurrence of START/STOP command, causing the OR gate 12 to output logic-1 signal on and inside the character pattern P. Output signal DD of the OR gate 12 is transferred to the monitor 4.

(b) Repetition

When both data D0 and D1 are logic-0, logic-1 signal appears only at the output terminal 0 of the decoder 8, and signals at the other terminals become logic-0. Consequently, logic-0 is applied to J and K terminals of the JK flip-flop 15 and to D terminal of the D flip-flop. Thus, the JK flip-flop 15 sustains the previous state and the D flip-flop 11 assumes logic-0. This means that output signal DD also maintains the previous state in REPETITION command mode. Signal DD is supplied to the monitor 4.

(c) Single Point

When both data D0 and D1 are logic-1, signal SS at the output terminal 3 of the decoder 8 becomes logic-1.

Consequently, the D flip-flop 11 loads logic-1 at the leading edge of clock signal DCLK. Thus, output signal DD of the OR gate 12 assumes logic-1 independent of output signal DC of the JK flip-flop 15. Signal DD is supplied to the monitor 4.

As in the first and second embodiments, character patterns can be generated without filling the interior of the outline in a separate procedure. Hence, writing character patterns into display memory 5 can be easily performed, and quick display of high quality characters can be achieved.

The third embodiment has the particular advantage that it necessitates no distinction between starting points and stop points in the process of writing. This significantly reduces the amount of work to write character patterns into memory. Moreover, unlike the conventional method, the embodiment includes additional data corresponding to single points of character patterns. As a result, single points such as tips of character strokes are clearly and definitely displayed on the screen. Furthermore, in the case of reduction in size of characters, degradation of character patterns such as omission or blurring does not occur because single points can clearly displayed.

(D) FOURTH EMBODIMENT

Figures 10A, 10B, 10C, 10D:
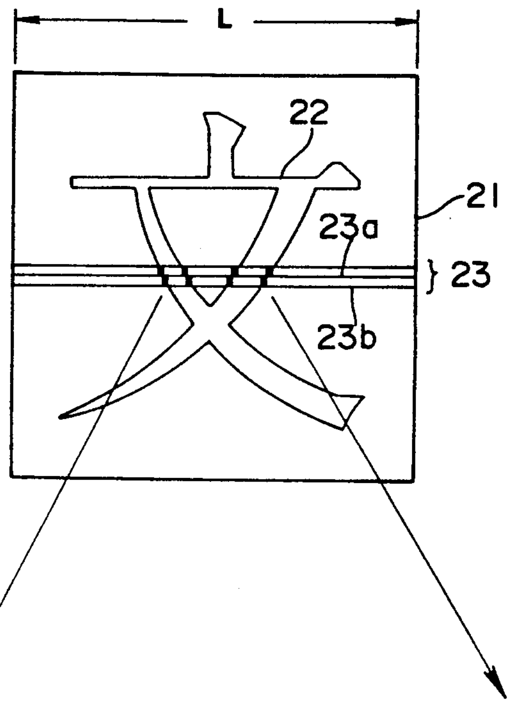
FIG. 10 (a–d) is a pictorial view illustrating the relationship between a displayed character and the content of a line-buffer 24 according to a fourth embodiment.

FIG. 10 shows a character 22 displayed on a screen 21 as well as the relationship between scan lines 23 and line buffer 24. In FIG. 10, the line buffer 24 is shown as if there were two line buffers. However, this is for convenience of explanation, and in reality, there is provided only one line buffer 24 as shown in FIG. 11. Specifically, the line buffer 24 has 2-bits for each of m-pixels on a scan line and is divided into two portions 24U and 24L as shown in FIG. 11. The right-hand side 24U that stores data corresponding to pixels n to m in FIG. 11 is shown in FIG. 10 (a); and the left-hand side 24L that stores data corresponding to pixels 1 to n-1 in FIG. 11 is shown in FIG. 10 (c).

Each 2-bits in the line buffer 24 stores a value indicating a position of each pixel in a character: whether the pixel represents a solid portion of a character (interior of outlines), or the background (exterior of outlines). The relationship between the values and the positions are as follows:

| | |
|---|---|
| 0 | exterior of outlines (e.g., white part on the screen 21) |
| 1 | interior of outlines (e.g., black part on the screen 21) |
| 2 | starting point (on a scan line) of an outline |
| 3 | stop point (on a scan line) of an outline |

Contents of the line buffer 24 shown in FIG. 10 are examples of those values: upper buffer data U associated with a scan line **23*a*, and lower buffer data L associated with a current scan line 23*b*, are shown in FIG. 10 (a) and 10 (c), respectively. The buffer data U and L take the value "2" at starting points of outlines of the character 22**, the value "3" at stop points thereof, the value "1" between starting and stop points, and "0" on the background. Details about the buffer data will be described later.

In contrast, character data R are stored in the display memory 5 having 1-bit for each pixel. The character data R takes the value "1" on outlines of characters and value "0" in the other parts. This is shown in FIG. 10 (b). The character data R, associated with the current scan line **23*b*, takes the value "1" on each outline of the character 2**.

The value of the current pixel is determined on the basis of the buffer data and character data. FIGS. 11 through 13 show the process of the determination.

FIG. 11 shows a diagram for the generation of nth-pixel data C. The line buffer 24 is divided into two parts: the left-hand side 24L for storing data associated with the 1st to (n-1)-th pixels (i.e., the left-buffer data L), and the right-hand side 24U for storing data associated with nth to mth pixels (i.e., the upper-buffer data U). The nth-pixel data C is produced by using the nth upper-buffer data U, the (n-1)th left-buffer data L, and the nth character data read out of the display memory. The nth pixel data C produced is written into the nth location (address n-1) of the line buffer 24 as new left-buffer data to be used as upper-buffer data for the next scan line. On completion of the process with the nth pixel, a similar process is performed with the (n+1)th pixel, and subsequently with the (n+2)th pixel, and so on.

FIG. 12 is a truth table that specifies pixel data C as the result of the logical operation between upper data U, left data L, and character data R. For example, consider the case where the character data R is "0". If both the upper and left pixels are interior of outlines (i.e., U=L="1"), the current pixel will be also interior of the outlines, and hence, the pixel data C takes the value "1". In contrast, if both the upper and left pixels are exterior of outlines (i.e., U=L="0"), it is apparent that the current pixel exists exterior of the outlines, and the value of the pixel data C becomes "0". Each case will be described below.

First, let us consider the case in which the value of character data R is "1". In this case, the pixel data C is specified only by the left buffer data L, with the upper buffer data U having no effect on it.

In the case where the left buffer data L is "0" (exterior of outlines) and the character data R is "1", as indicated by P1 in FIG. 13, the current pixel becomes the starting point of an outline. Hence, the pixel data C of the current pixel takes a value of "2" (starting point). On the other hand, if the left buffer data L is "1" (interior of outlines) or "2" (starting point), and the character data R is "1" as indicated by P2 and P3 in FIG. 13, pixels P2 and P3 become stop points of outlines. As a result, the value of pixel data C of these pixels is "3" (stop point). Further, when the left buffer data L is "3" and the character data R is "1", as indicated by the point P4, the pixel data C also becomes "3". This is because although the left buffer data L has ended the outline once, the current pixel is forced to continue the dot display by the character data R of value "1". Since the value "3" includes such a case, the value "3" is called hereafter a "stop point" or a "continuing point".

Next, let us consider the case where the character data R is "0", and the upper buffer data U is "3" (stop point or continuing point).

If the upper buffer data U is "3", and the left buffer data L is "1", as indicated by P5, the current pixel is to be interior of outlines, and therefore the pixel data C becomes "1". In case where the upper buffer data U is "3", and the left buffer data L is "2", there are two cases. First, if the pixel to the upper left of the current pixel takes one of the three values "0", "2", or "3" (called P6, though not shown in FIG. 13), the left buffer data L of value "2" is considered to be the starting point of an outline. Hence, the current pixel is considered to be interior of outlines, and pixel data C thereof becomes "1". Second, if the pixel to the upper left of the current pixel takes "1", as indicated by P18, the pixel data C becomes "0", which is an exceptional case. This is because the upper pixel of a value "3" is considered to be a stop point or a continuing point, and hence, the left pixel is assumed to be a single point. If both the upper and left buffer data U and L are "3", as indicated by P7, the pixel data C thereof assumes a value "0", because the left pixel is considered to be a stop point of an outline.

Next, let us consider the case where the character data R is "0", and the upper buffer data U is "2".

If both the upper and left buffer data U and L are "2" (starting point) as indicated by P9 in FIG. 13, or the upper buffer data U is "2" and the left buffer data L is "3" as indicated by P10, the pixel data thereof takes a value "1", because pixels p9 and P10 are considered to be interior of outlines. If the upper buffer data U is "2", and the left buffer data L is "1" (called P8, though not shown in FIG. 13), the pixel data C thereof is "1", because the left buffer data L is "1" (interior) and the character data R is "0".

Here, let us consider the case where the character data R is "0" and the upper buffer data U is "1".

If the left buffer data L is "1" or "2", as is indicated by P11 and P12, it is apparent that these pixels exist interior of outlines. Therefore, the pixel data C of pixels P11 and P12 become "1". Further, if the upper buffer data U is "1" and the left buffer data L is "3", as indicated by P13, the current pixel P13 is considered to be interior of outlines, because the upper-adjacent pixel is interior and the character data R is "0", and hence the pixel P13 must be interior. As a result, the pixel data C of the pixel P13 is considered to be "1".

Next, let us consider the case where the character data R is "0" and the upper buffer data U is also "0".

If the upper buffer data U is "0", the left buffer data is "2", and the character data R is "0", as indicated by P15 in FIG. 13, the left-hand adjacent pixel is considered to be a single point. Therefore, the pixel data C of the pixel P15 becomes "0". Furthermore, if the upper buffer data U is "0" and the left buffer data L is "3" as indicated by P16, the left-hand adjacent pixel of the pixel P16 is a stop point of an outline. Consequently, the pixel data C of the pixel 16 is to be "0". In addition, if the left-buffer data L is "1" and the character data is "0" (called P14 though not shown in FIG. 13), the pixel data C is specified as "0", because the upper adjacent pixel is exterior of the outline. In other words, if the upper adjacent pixel represents background (white), and the character data R is "0", the current pixel always becomes background, regardless of the value of left buffer data L. Thus, if the upper-buffer data is "0", the current pixel data C is also to be "0" independently of the value of left-buffer data L (even if the outline is not enclosed).

Finally, if both the character data R and left buffer data L are "0", the pixel data C becomes "0" because it must take the same value as the left pixel regardless of the upper buffer data U.

The current pixel data C thus obtained is displayed on the screen of a monitor: if the pixel data C assumes "0" it is displayed as background (e.g., white), while if it assumes "1" to "3", it is displayed as an outline or interior (e.g., black) thereof.

The above is the principle of the embodiment. An application of the principle for a character display apparatus will be described hereafter.

The character display apparatus has the same construction as that shown in FIG. 2, except for the display memory and the display pattern modification circuit. Hence, only these different components will be described.

Display memory 5 of the fourth embodiment is the frame memory of the monitor 4 in FIG. 2. It has 1-bit for every pixel on the screen of the monitor 4 and stores outlines of character patterns to be displayed. It will be described in more detail later.

Figure 14:
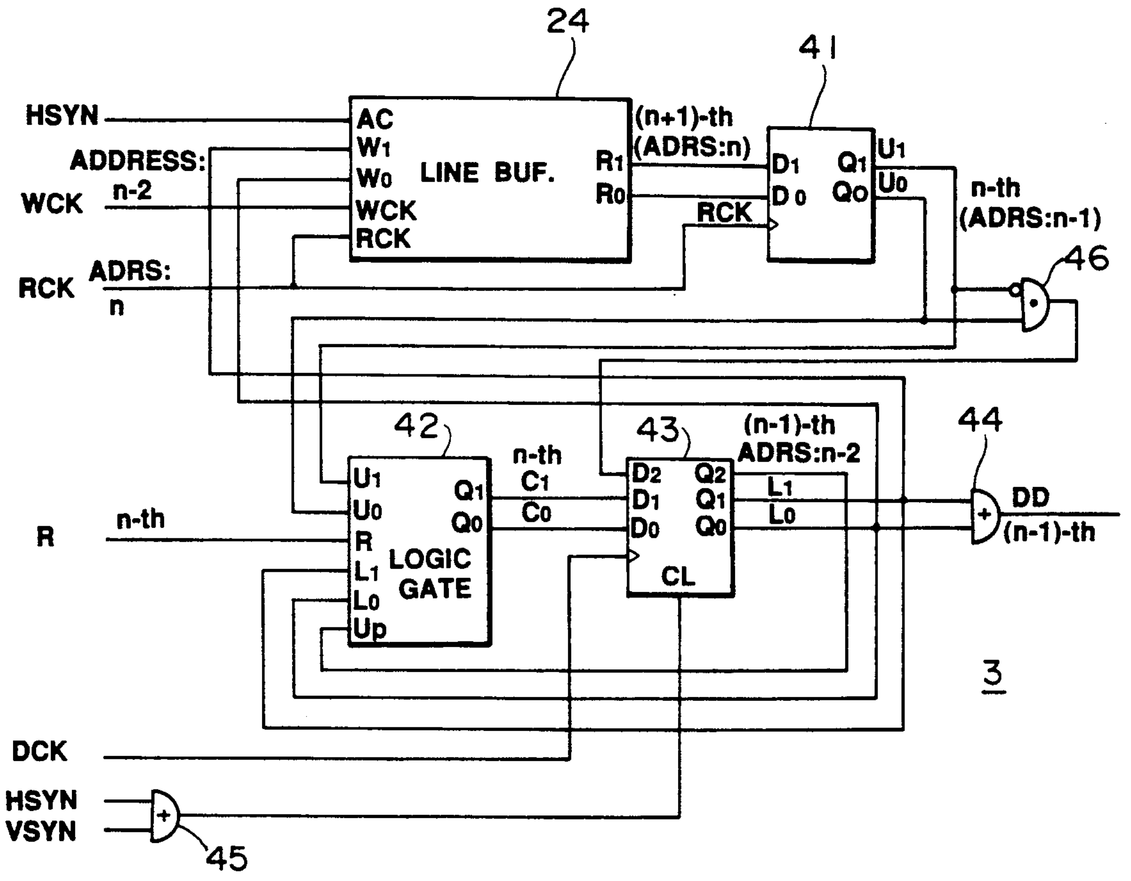
FIG. 14 is a block diagram showing an electrical construction of a display pattern modification circuit according to the fourth embodiment.

FIG. 14 is a block diagram showing a display pattern modification circuit 3 of the fourth embodiment.

In this figure, numeral 24 designates the line buffer mentioned above. The line buffer 24 has m addresses which is the same number as that of pixels on one scan line, and each address includes 2-bits. In other words, memory capacity of the line buffer memory 24 is 2m bits, and each 2-bits thereof corresponds to each pixel on a scan line. The line buffer 24 is provided with two write data terminals W0 and W1, two read data terminals R0 and R1, write-clock terminals WCK, read-clock terminals RCK, and address-clear terminals AC. The buffer data of the first, second, third, . . . m-th pixel on a scan line is to be stored to address 0, 1, 2, . . . (m-1).

Assume that the buffer data of address n in the line buffer 24 appears at the read data terminals R0 and R1. It corresponds to the (n+1)-th pixel on a scan line. The data is applied to the data-input terminals D0 and D1 of a 2-bits D flip-flop 41. To the clock terminal of the D flip-flop 41, read-clock RCK is being fed, and the data supplied thereto is delayed by one clock interval. As a result, the n-th data (i.e., data of address (n-1)) appears at the output terminals Q0 and Q1 thereof. It is the upper-buffer data U described above, and is applied to a logic gate 42.

The logic gate 42 receives the character data R, upper buffer data U, and the left-buffer data L described above. The upper buffer data U is the n-th data read from the address (n-1) of the line buffer 24, the left buffer data L is data relating to the left-hand pixel of the current pixel, that is, the most recently displayed pixel data, and the character data R is the current character data on the display memory 5 that corresponds to the n-th pixel on the current scan line (see FIG. 11).

The pixel data C is obtained from these data U, L and R on the basis of the truth table shown in FIG. 12, and appears at output terminals Q0 and Q1 of the logic gate 42 as signals C0 and C1. These signals C0 and C1, which constitute the pixel data C, are supplied to data-input terminals D0 and D1 of a 3-bits D flip-flop 43. To a data-input terminal D2, output of an AND gate 46 is applied. The AND gate 46 provides logic-1 when the output data U of the D flip-flop is "1", i.e., when data U0="1" and U1="0". This means that the AND gate 46 is provided for the processing of the pixel P18 in FIG. 13, which will be described in more detail later. The clock terminal of the D flip-flop 43 receives dot clock DCK and delays the n-th data by one clock interval. In other words, the D flip-flop produces the (n-1)-th pixel data as the left buffer data L (L0 and L1). The (n-1)-th data is applied to an OR gate 44 where the L0 and L1 are ORed and supplied to the monitor 4 as dot data DD.

The (n-1)-th left buffer data L is fed back to the logic gate 42. It is also supplied to data-write terminals W0 and W1 of the line buffer 24 and is written to address (n-2) thereof. The written data is used as the upper buffer data of the next scan line. The clear terminal of the D flip-flop 43 receives an OR signal between the horizontal synchronizing signal HSYN and vertical synchronizing signal VSYN from an OR gate 45. Hence the D flip-flop 43 is cleared by these synchronizing signals.

Figure 15:
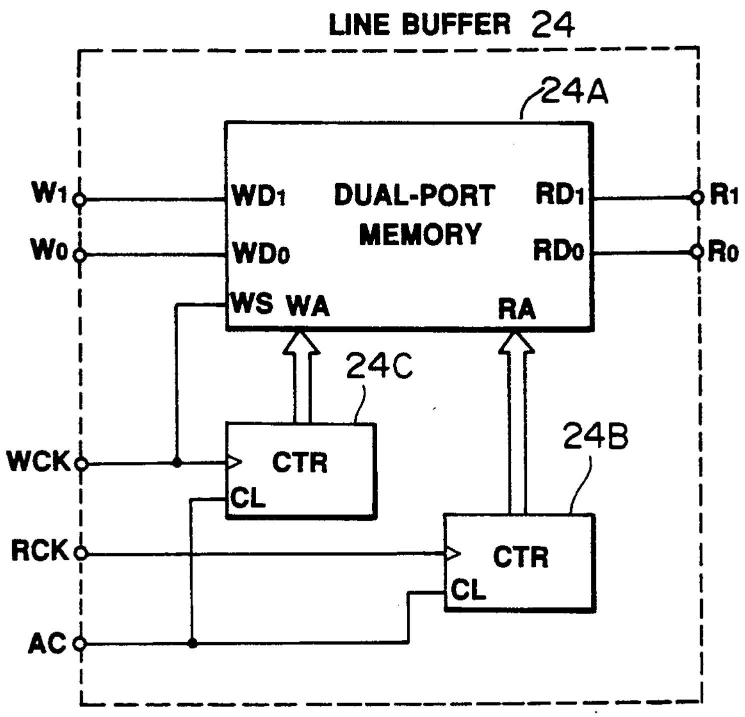
FIG. 15 is a block diagram showing a configuration of the line-buffer 24.

FIG. 15 is a block diagram showing construction of the line buffer 24. The buffer comprises dual-port memory 24A, a read address counter 24B, and a write address counter 24C.

The dual-port memory 24A is memory that can achieve write and read operation independently and simultaneously at different addresses. Write data terminals WD0 and WD1, and read data terminals RD0 and RD1 thereof are respectively connected to the write data terminals W0 and W1, and read data terminals R0 and R1 of the line buffer 24. A read address of the dual-port memory 24A is designated by the read address counter 24B. The read address counter 24B is cleared by the horizontal synchronizing signal HSYN supplied to address clear terminal AC and is incremented by the read clock RCK. Likewise, a write address of the dual-port memory 24A is designated by the write address counter 24C. The write address counter 24C is also cleared by the horizontal synchronizing signal HSYN, and incremented by the write clock WCK.

FIG. 8 is a block diagram of the logic gate 42 mentioned above.

A careful inspection of the truth table in FIG. 12 will show that values of the upper bit C1 of pixel data C is equal to those of character data R. Therefore, it is enough to have the character data R go through a voltage follower 51 to obtain the upper bit C1.

Let us consider the lower bit C0 of pixel data C. In the case where the character data R is "0", the lower bit C0 takes value "1" when the left buffer data L and upper buffer data U are both "1" to "3" with two exceptions. One exception occurs when both the upper and left buffer data U and L are "3", which corresponds to pixel P7. The other exception arises when the upper buffer data U is "3", the left buffer data L is "2", and upper-left buffer data is "1", which corresponds to pixel P18 as described above. On the other hand, in the case where the character data R is "1", the lower bit C0 becomes "1" when the left buffer data L is "1", "2" and "3".

Figure 16:
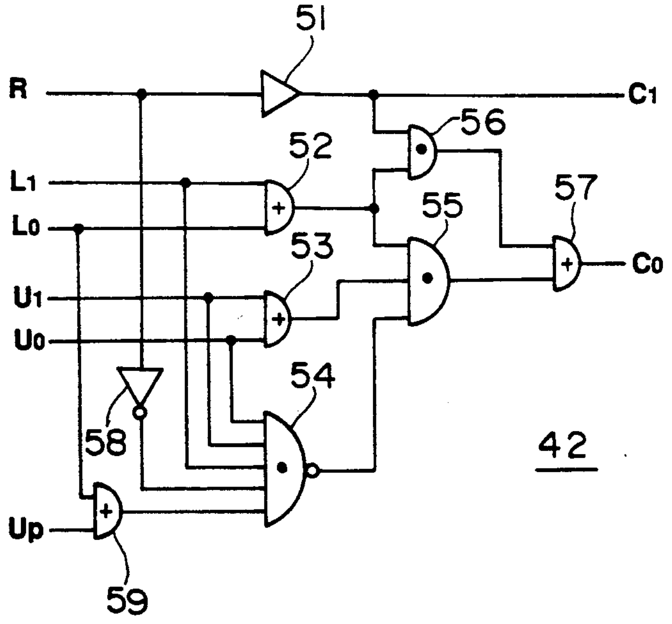
FIG. 16 is a circuit diagram showing a configuration of a logic gate 42 of the fourth embodiment.

On the basis of these facts, the lower bit C0 can be obtained as shown in FIG. 16. First, two OR gates are provided: an OR gate 52 that ORs the L0 and L1 of the left buffer data L, and an OR gate 53 that ORs the U0 and U1 of the upper buffer data U. Outputs of these OR gates are applied to an AND gate 55. Thus a circuit is obtained to produce logic-1 when both the upper and left buffer data are "1" to "3".

The circuit, however, provides "1" even in the case of exceptions mentioned above. To satisfy the exceptional conditions, there is provided NAND gate 54 that NANDs the 2-bits U0 and U1 of the upper buffer data, the upper bit L1 of the left buffer data L, inverted signal of the character data R, and OR data between the lower bit L0 of the left buffer data L and upper-left buffer data Up. The output of the NAND GATE 54 is applied to the AND gate 35 and inhibit the output thereof to satisfy the exceptional conditions. As a result, the AND gate 55 produces the lower bit C0 when the character data R is "0". Incidentally, an invertor 58 is provided to invert the character data R, and an OR gate 59 is provided to OR the lower bit L0 of the left buffer data L and the upper-left buffer data Up.

In the case where the character data R is "1", the lower bit C0 is obtained as AND between the data R and output of the OR gate 52. This is achieved by an AND gate 56. The lower bit C0 is finally obtained as AND between outputs of the AND gate 55 and 56 by use of an OR gate 57.

Here, the operation of the apparatus will be described.

(1) SETTING OF CHARACTER DATA

As mentioned above, character patterns to be displayed are prestored in the display memory 5. Areas on the memory 5 occupied by the character data R differs by resolution and size of character patterns. Hereafter, the setting of character data R of only one character is described for brevity.

In the display memory 5, as shown in FIG. 10, only starting points and stop points of outlines in the scan direction are set "1" and all the other bits are set "0". In addition, a single point that appears, for example, at the tip of an outline, is represented by a single bit on the display memory 5.

(2) GENERATION OF CHARACTER PATTERNS

When a character-pattern-generation command is given to the display controller 2, it reads character data R from the display memory 5. The character data R is directly supplied to the display modification circuit 3.

The display modification circuit 3 produces display data in accordance with the timing shown in FIG. 17.

In FIG. 17, read clock RCK, dot clock DCK, and write clock WCK is produced sequentially, each appearing with a delay of one clock interval. Each of these clocks includes m pulses, which is equal to the number of pixels on one scan line. In FIG. 17, a series of numbers starting from 1 (1, 2, 3, . . . m-1, m) represents the number of pixels on a scan line, while a series of numbers starting from 0 (0, 1, 2, . . . . m-2, m-1) indicates addresses of the line buffer 24.

When the horizontal synchronizing signal HSYN is supplied at timing t0, both the read address counter 24B and write address counter 24C are cleared to zero by the signal HSYN (see FIG. 17 (a), (e) and (k)). At the same time, the D flip-flop 43 is cleared and the output thereof becomes "0". The line buffer 24, on the other hand, is initialized by writing zero during vertical synchronizing period. In practice, this is achieved by forcing the D flip-flop 43 clear to zero and write outputs thereof (L0 and L1) to the line buffer 24, or by forcing the character data R "0" during the vertical synchronizing period. This is because the pixel data C becomes "0" independently of the upper buffer data U, when both the character data R and left buffer data L are "0".

At timing t1 when display-timing signal DTM makes a positive transition from "0" to "1", the display controller 2 reads the first character data R of the current scan line from the display memory 5, and supplies it to the logic gate 42 (see FIG. 17 (b) and (c)). At the same time, the read clock RCK appears and loads the content of address 0 of the line buffer 24 to the D flip-flop 41 by the leading edge thereof. In addition, the read address counter 24B is incremented to indicate address 1 (see FIG. 17 (d), (e), (f), (g)). At this timing, output of the D flip-flop 43 is maintained at "0", because the dot clock DCK does not yet appear.

As a result, to the logic gate 42 are supplied the upper buffer data U from address 0 of the line buffer 24, the first character data R, and the left buffer data L whose value is "0", and the current pixel data C is produced from output terminals thereof.

At timing t2, the second character data R is read out from the display memory 5 and supplied to the logic gate 42 (FIG. 17 (c)). At the same time, read clock RCK and dot clock DCK appear (FIG. 17 (d), (h)). When the dot clock DCK is applied to the D flip-flop 43, the first pixel data C supplied from the logic gate 42 to the D flip-flop 43 is loaded thereto (FIG. 17 (i)). The loaded pixel data C is fed back to logic gate 42 as left buffer data L, as well as supplied to the OR gate 44. The OR gate 44 transfers the pixel data C to the monitor 4 as dot data DD of the first pixel.

Furthermore, when the read clock RCK is supplied to the D flip-flop 41 at timing t2, the content of address 1 (the second buffer data) of the line buffer 24 is loaded to the D flip-flop 41 (FIG. 17 (g)). In addition, the read address counter 24B is incremented to indicate address 2 (FIG. 17 (e)), and the content thereof appears at output terminals of the line buffer 24 (FIG. 17 (f)). As a result, a set of three data, the second upper buffer data U from address 1 of the line buffer 24, the left buffer data L that was the first pixel data, and the second character data R, is supplied to the logic gate 42, and the second pixel data C is produced from output terminals thereof (see also FIG. 11).

At timing t3, the third character data R is read out from the display memory 5 and supplied to the logic gate 42 (FIG. 17 (c)). At the same time, read clock RCK, dot clock DCK, and read clock RCK appear (FIG. 17 (d), (h) and (j)).

When the write clock WCK is supplied to the line buffer 24, the left buffer data L which was the first pixel data is written to address 0 of the line buffer 24. Further, the write address counter 24C is incremented, changing the write address of the line buffer 24 to address 1 (FIG. 17 (k)). The data written into address 0 will be used as upper buffer data of the next scan line.

When the second dot clock DCK is applied to the D flip-flop 43 at timing t3, the second pixel data C supplied from the logic gate 42 to the D flip-flop 43 is loaded thereto (FIG. 17 (h), (i)). The pixel data C loaded is fed back to the logic gate 42 as left buffer data L, as well as to the OR gate 44. The OR gate 44 transfers the pixel data C to the monitor 4 as dot data DD of the second pixel.

Furthermore, when the read clock RCK is supplied to the D flip-flop 41 at timing t3, the content of address 2 (the third buffer data) of the line buffer 24 is loaded to the D flip-flop 41 (FIG. 17 (g)). In addition, the read address counter 24B is incremented to indicate address 3 (FIG. 17 (e)), and the content thereof appears at output terminals of the line buffer 24 (FIG. 17 (f)). As a result, a set of three data, the third upper buffer data U from address 2 of the line buffer 24, the left buffer data L that was the second pixel data, and the third character data R, is supplied to the logic gate 42, and the third pixel data C is produced from output terminals thereof.

At timing t4, similar operation is carried out: the fourth character data R is read out from the display memory 5, the fourth upper buffer data (data of address 3 in the line buffer 24) is loaded to the D flip-flop 41, and the third pixel data C is loaded to the D flip-flop 43, thus dot data DD of the third pixel being produced from the OR gate 44. Further, the fourth pixel data C is produced from the logic gate 42, by using the third pixel data as left buffer data L, the forth upper buffer data U, and the fourth character data R. In addition, the third pixel data is stored to address 2 of the line buffer 24.

After that, similar operation continues, and in due course, at timing tm, the display controller 2 reads the last character data, i.e., the character data R of the m-th pixel from the display memory 5, and supplies the character data R to the logic gate 42. At the same time, the (m-2)-th pixel data is written into address (m-3) of the line buffer 24 by the write clock WCK (see FIG. 17 (j)). After this, the write address counter 24C is incremented to point address (m-2) (see FIG. 17 (k)). In addition, the (m-1)-th pixel data C is loaded to the D flip-flop 43 by the dot clock DCK (see FIG. 17 (h) and (i)). The output of the D flip-flop 43 is supplied to the logic gate 42 as left-buffer data L, as well as to line-buffer 24 and OR gate 44. The OR gate 24 transfers it to the monitor 4 as (m-1)-th dot data DD.

Furthermore, the D flip-flop 41 loads the m-th data, i.e., data of address (m-1) in the line buffer 24, by the read clock RCK (see FIG. 17 (g)). At the same time, the read address counter 24B is incremented by the clock RCK to indicate address m (see FIG. 17 (e)).

Similarly, at timing tm+1, the (m-1)-th pixel data is written into address (m-2) of the line-buffer 24 by write clock WCK (FIG. 17 (j)). After this, the write address counter 24C is incremented to point address (m-1) (see FIG. 17 (k)). In addition, the m-th pixel data C is loaded to the D flip-flop 43 by dot clock DCK (FIG. 17 (h) and (i)). The output of the D flip-flop 43 is supplied to the logic gate 42 as left-buffer data L, as well as to line-buffer 24 and OR gate 44. The OR gate 24 transfers it to the monitor 4 as m-th dot data DD.

At the timing tm+1, however, the read clock RCK is not provided, so that the read address of the line-buffer 24 and D flip-flop 41 is the same as that of timing tm.

Finally, at timing tm+2, the write clock WCK is presented and the m-th pixel data applied to the write terminal of the line-buffer 24 is entered to address (m-1) thereof. Further, the write address counter 24C is incremented to point address m thereafter.

Thus, display of pixels on a scan line is completed. In like manner, dot data DD are consecutively supplied to the monitor 4, and hence, character patterns are displayed on the monitor screen.

Although specific embodiments of a method for generating character patterns in accordance with the present invention have been disclosed, it is not intended that the invention be restricted to either the specific configurations or the uses disclosed herein. Modifications may be made in a manner obvious to those skilled in the art.

For example, the invention can be used not only for generating character patterns, but also for generating general figure patterns that have many areas to be filled.

Furthermore if data corresponding to all points on outlines and in interior spaces of characters or figures are stored in memory as single points, this system can be used with other dot-type display methods. Moreover, commands described above are only examples and can be altered to fit other code systems. For example the following code system can be adopted:

| D1 | D0 | COMMAND NAME |
|---|---|---|
| 0 | 0 | REPETITION |
| 0 | 1 | SINGLE POINT |
| 1 | 0 | STARTING POINT |
| 1 | 1 | Stop point |

Furthermore, the construction of the display memory 5 is not restricted to those of the above-mentioned embodiments. Any known memory devices in which more than 2 bits can be allocated for each pixel on the screen can be employed.

Moreover, though in the fourth embodiment of the invention, pixel data to be displayed are made from the upper buffer data and left buffer data concerning pixels that located immediately upper and left of the current pixel, the method for making pixel data is not limited to this method. For example, more periphery pixels around the current pixel can be used to get more information for producing pixel data to be displayed.

Accordingly, it is intended that the invention be limited only by the scope of the appended claims.

What is claimed is:

1. A method for generating character patterns and/or figure patterns using a display memory means for storing character data and/or figure data of 1 bit for each pixel on a screen as information indicating outlines of character and/or figures to be displayed, and reading the stored character data and/or figure data from said display memory means consecutively to generate dot data corresponding to character patterns and/or figure patterns to be displayed on the basis of said character data and/or figure data, said character patterns and/or figure patterns having an upper portion that is contiguous with a lower portion, wherein said character patterns and/or figure patterns do not have the upper portion sloping down to the left and the lower portion sloping down to the right, said method for generating character patterns and/or figure patterns utilizing a line-buffer means containing data relating to pixels on a current scan line as well as on the scan line directly above thereof, said method for generating character patterns and/or figure patterns comprising the steps of:

reading character data and/or figure data indicating outlines of characters and/or figures to be displayed, the character and/or figure data corresponding to a current displaying pixel from said display memory means;

reading buffer data relating to said scan line and line directly above thereof from said line-buffer means;

generating said dot data by performing logical computation on said character data and/or figure data corresponding to current pixel and line-buffer data relating to said scan lines; and writing said dot data to said line-buffer.

2. A method for generating character patterns and/or figure patterns using a display memory means containing character data and/or figure data of 1 bit for each pixel on a screen as information indicating outlines of character and/or figures to be displayed, and reading stored character data and/or figure data from said display memory means consecutively to generate dot data displayed on the basis of said character data and/or figure data, said character patterns and/or figure patterns having a contiguous upper portion and lower portion, wherein said character patterns and/or figure patterns do not have the upper portion sloping down to the left and the lower portion sloping down to the right, said method for generating character patterns and/or figure patterns utilizing a line-buffer means for storing upper buffer data and left buffer data for each pixel on a scan line, a current pixel to be displayed indicative of a relationship between the current pixel to be displayed and on upper adjacent pixel thereof, said current pixel to be displayed indicative of a relationship between said current pixel to be displayed and a left adjacent pixel, said method for generating character patterns and/or figure patterns comprising the steps of:

reading character data and/or figure data indicating outlines of characters and/or figures to be displayed, the character and/or figure data corresponding to n-th (n=1 to m)

reading n-th dot data of said line-buffer as upper buffer data;

reading (n - 1)-th data as left buffer data;

generating n-th dot data by performing logical computation on said character data and/or figure data corresponding to said n-th current pixel, said upper buffer data, and said left buffer data;

displaying said current pixel on the basis of said n-th dot data; and updating said line-buffer by writing said n-th dot data to said line-buffer as n-th data.

* * * * *